United States Patent [19]

Kawashima

[11] Patent Number: 5,568,551
[45] Date of Patent: Oct. 22, 1996

[54] DATA MANAGEMENT METHOD AND SYSTEM THEREOF

[75] Inventor: Isao Kawashima, Kanagawa, Japan

[73] Assignee: Sony Corporation, Tokyo, Japan

[21] Appl. No.: 285,847

[22] Filed: Aug. 4, 1994

[30] Foreign Application Priority Data

Aug. 6, 1993 [JP] Japan ............................ 5-196161

[51] Int. Cl.⁶ ..................................................... H04L 9/00
[52] U.S. Cl. ................................. 380/4; 380/49; 380/23
[58] Field of Search ................................ 380/4, 49, 48, 380/21, 23, 25

[56] References Cited

U.S. PATENT DOCUMENTS 5,347,578  9/1994  Duxbury ................................. 380/4
5,400,403  3/1995  Fahn et al. ............................. 380/4

Primary Examiner—David C. Cain
Attorney, Agent, or Firm—Limbach & Limbach L.L.P.

[57] ABSTRACT

To enable management by a center of data transferred to a user terminal from the center, an ISDN, which has a call connecting means which forms a signal channel before forming a data channel between a user terminal and center and enable user to user transfer of data on that signal channel. In the control routine, control data regarding data management which prohibits or releases copying or reediting between a center and user is transferred between the center and user terminal. The data after transfer to the user terminal can also be managed from the center.

22 Claims, 8 Drawing Sheets

USER TERMINAL

DATA MANAGEMENT METHOD AND SYSTEM THEREOF

BACKGROUND OF THE INVENTION

1. Field of the Invention

The present invention relates to a data management method and a data management system for managing data through a communication line.

2. Description of the Related Art

At the present time, as the means for preventing the transfer to other parties of data, music, video, and other software obtained by a user from a data storage apparatus of a data center (hereinafter referred to as "data etc."), use has been made of the method of burying the control data relating to the data management such as the prohibition of copying or reediting (hereinafter referred to as the "control data") in the data etc. at the time of transfer of the data etc. from the data center to the user terminal and the method of deliberately scrambling the data etc. and giving at the same time decoding data.

The methods of transfer of control data and deliberate scrambling and giving decoding data are performed using a communication channel (hereinafter referred to as a data channel) after that communication channel is formed between the user terminal and the center in the same way as the transfer of the data etc.

In the above-mentioned conventional methods shown above, it is not possible for the data center to manage the data etc. after transfer to the user terminal. Therefore, up to now, there has been the problem that the data center could not determine if the data etc. was being copied or reedited or the deliberately scrambled data was being maliciously restored.

SUMMARY OF THE INVENTION

The present invention has as its object to resolve the above problem and provide a method and system enabling a data center to manage the data etc. transferred to a user terminal.

The present invention takes note of the fact that in an ISDN (integrated services digital network), a signal channel is established between the user terminal and the data center before the formation of the data channel and that there is a control routine relating to call connection enabling transfer of user-user information on that channel and therefore enables control data relating to the data management, such as prohibition or release of copying or reediting, to be transferred between the data center and the user terminal in the control routine. As a result, in the present invention, it is possible for the data center to manage the data etc. after transfer to the user terminal.

Therefore, according to the present invention, there is provided a data management system and method in a data communication system which has a control means or step which, when performing communication between a first communication means and a second communication means, establishes a signal channel before formation of a data channel and enables transfer of data among the communication means on said signal channel, wherein before said data channel is used to transfer data, said signal channel is used to transfer control data regarding the data management.

According to a first aspect of the present invention, there is provided a data management system (apparatus) in which, at the time of sending out data from the data center to the user terminal, when a key is used by the user terminal to open or decode the data, wherein provision is made of means for sending out a first cipher code for requesting a key required for opening or decoding data from the user terminal to the data center before transfer of data and sending out a second cipher code necessary for opening or decoding data from the data center to the user terminal, and provision is made of means for sending out a third cipher code necessary for opening or decoding data from the user terminal to the data center after the transfer of said data and sending out a fourth code necessary for opening or decoding said data from the data center to the user terminal.

It is also possible to use as the first cipher code data specifying the party using the user terminal.

Further, it is possible to use as the second cipher code a cipher code for requesting a key necessary for opening or decoding the data.

Also, it is possible to use as the third cipher code data specifying the party using the user terminal and a cipher code for requesting a key necessary for opening or decoding the data.

In addition, it is possible to use as the fourth cipher code a key necessary for opening or decoding the data.

Further, it is possible to transfer the first, second, third, and fourth cipher codes in the call control routine between the user terminal and the data center.

Also, it is possible to use the ISDN call control routine as the call control routine between the user terminal and the data center.

Further, it is possible to carry the first, second, third, and fourth cipher codes in the user-user information in the call control routine between the user terminal and the data center.

Further, it is possible to work between the user terminal and the data center to place the first cipher code on user-user information of a call setting message from the user terminal to the data center, place the second cipher code on the call message, response message, or call message and response message from the data center to the user terminal, place the third cipher code on user-user information of a call setting message from the user terminal to the data center, and place the fourth cipher code on the user-user information of the call message from the data center to the user terminal.

Further, according to a second aspect of the present invention, there is provided a data management method in which, at the time of sending out data from the data center to the user terminal, when a key is used by the user terminal to open or decode the data, including:

a step of sending out a first cipher code for requesting the key from the user terminal to the data center before transfer of data, and a step of sending out a second cipher code responding to the request for a key from the data center to the user terminal and, further including a step of sending out a third cipher code for applying for said key from the user terminal to the data center, and a step of sending out a fourth code responding to the said application for a key from the data center to the user terminal.

In the step of sending out the first cipher code, it is possible to specify the party using the user terminal.

Further, in the step of sending out the second cipher code, it is possible to carry a cipher code for requesting a key necessary for opening or decoding the data.

Also, in the step of sending out the third cipher code, it is possible to carry data specifying the party using the user terminal and a cipher code for requesting a key necessary for opening or decoding the data.

In addition, in the step of sending out the fourth cipher code, it is possible that a key necessary for opening or decoding the data also be carried.

Also, in the step of sending out the first, second, third, and fourth cipher codes in the call control step between the user terminal and the data center, it is possible to use the call control step between the user terminal and the data center.

Further, it is possible to use as the call control routine between the user terminal and the data center, the call control step of the ISDN.

Further, the step of sending out the first, second, third, and fourth cipher codes between the user terminal and the data center is placed in the user-user information in the call control step.

According to a third aspect of the present invention, there is provided a data management method wherein at the time of sending out data from the data center to the user terminal, when a key is used by the user terminal to open or decode the data, including:

a step of sending out data specifying the party using the user terminal from the user terminal to the data center placed on the user-user information of the call setting message before the transfer of data, followed by a step of sending out a cipher code for requesting a key required for opening or decoding the data from the data center to the user terminal placed on either the call message or the response message, followed by a step of sending out a cipher code for requesting a key required for opening or decoding data from the user terminal to the data center placed on the user-user information of the call setting message after the transfer of data, and followed by a step of sending out the key necessary for opening or decoding the data from the data center to the user terminal placed on the user-user information of the call message.

According to a fourth aspect of the present invention, there is provided a data management method wherein, at the time of sending out data from the data center to the user terminal, when a key is used by the user terminal to open or decode the data, including:

a step of sending out data specifying the party using the user terminal from the user terminal to the data center placed on the user-user information of the call setting message, followed by a step of sending out a cipher code for requesting a key required for opening or decoding the data from the data center to the user terminal placed on either the call message or the response message in the case where the data specifying the party using the user terminal from the user-user information of the call setting message in the data center is confirmed, followed by a step of storing said cipher code in said user terminal, followed by a step of sending out said data from said data center to said user terminal, followed by a step of storing said data in said user terminal, followed by a step of sending out data specifying the party using the user terminal and a cipher code for requesting a key required for opening or decoding said data from the user terminal to the data center placed on the user-user information of the call setting message at the time of opening or decoding the data in the user terminal, and followed by a step of sending out the key necessary for opening or decoding data from the data center to the user terminal placed on the user-user information of the call message.

The user obtains the data etc. from the data center by using the signal channel at the time of call origination so as to send a call setting message in which has been placed, for example, the personal ID data and caller number of the user in addition, for example, to the request for use of the data storage apparatus, the designation of the requested data etc., and other data for access to the data storage apparatus in the data center.

When receiving the above call setting message through the signal channel, the data center extracts the user-user information from the call sending message. Then, it sends out to the user a call message indicating that it has received the message (at this time, the signal channel transmitting the call control signals is connected, but the data channel for the transfer of data is still not connected).

Further, it decodes the user-user information carried on the call setting message and judges if use of the data storage apparatus in the data center is requested, what requested data etc. is designated, if the personal ID data of the user is proper, if the caller number is proper (whether caller number designated by the user in the user-user information matches the caller number given by the communication network).

When there is no request for utilization of the data storage apparatus in the data center, when the designation of the requested data etc. is not proper, when the requested data etc. does not exist, for example, when the personal ID data of the user himself is not proper, or when the caller number is not proper, a disconnect message is immediately sent out and a disconnect routine shifted to without the formation of the data channel.

On the other hand, when the user-user information is decoded and there is a request for utilization of the data storage apparatus, the designation of the requested data etc. is suitable, the personal ID data of the user himself is proper, and the caller number is proper, a response message is sent out so that the data channel is formed and the designated data etc. is sent out.

At this time, the response message carries a message showing the receipt of the control data from the user, a message for requesting that the user stand by for reception of data etc., and a cipher code for requesting an opening key to the data center at the time of opening the data etc. transferred by the user later as user-user information.

Note that it is also possible to have the message showing the receipt of the control data from the user, a message for requesting that the user stand by for reception of data etc., and a cipher code for requesting an opening key to the data center at the time of opening the data etc. transferred by the user later placed on the call message or the call message and response message.

The user receiving the response message prepares to receive the desired data etc., responds, and forms a data channel. Further, it stores the cipher code for requesting the opening key from the data center.

Next, the data center sends out the requested data etc. through the formed data channel to the user. Further, the user receives the desired data etc. from the data center. When the transfer of the data is ended, the center ends the transmission and sends out a disconnect message carrying a notification of the charge for the data etc. as user-user information, shifts to the disconnect routine, and ends the communication.

Further, at the time the user opens the data etc. transferred from the data storage apparatus in the data center, the user obtains the authorization for opening from the data center.

Therefore, at the time a user opens his own storage apparatus, the user terminal automatically calls up the data center and uses the signal channel to send out a call setting message comprising the cipher code for requesting an opening key sent from the data center in advance, the designation of the data etc. to be opened, and the personal ID data and caller number of the user carried on the user-user information.

When receiving the above call setting message through the signal channel, the data center extracts the user-user information from the call sending message.

Then, it decodes the user-user information carried on the call setting message and judges if the cipher code for requesting the opening key is proper, what data etc. to be opened is designated, if the personal ID data of the user himself is proper, if the caller number is proper, etc.

The data center decodes the user-user information and when the cipher code for requesting the opening key is proper, the designation of the data etc. to be opened is suitable, the personal ID data of the user himself is proper, and the caller number is proper, sends out a call message comprised of the opening key carried on the user-user information to the user, then sends out a disconnect message and shifts to the disconnect routine.

The user terminal uses the received opening key to open the desired data etc. from the storage apparatus.

On the other hand, if the cipher code for requesting the opening key is not proper, the designation of the data etc. to be opened is not suitable, the personal ID data of the user himself is not proper, or the caller number is not proper, it sends out an ordinary call message to the user, then immediately sends out a disconnect message and shifts to the disconnect routine.

BRIEF DESCRIPTION OF THE DRAWINGS

The above objects and features and other objects and features of the present invention will be more apparent from the following description made with reference to the accompanying drawings, in which.

DESCRIPTION OF THE PREFERRED EMBODIMENTS

Below, a detailed explanation will be made of embodiments of the data management method and apparatus (system) according to the present invention with reference to the drawings.

Figure 1:
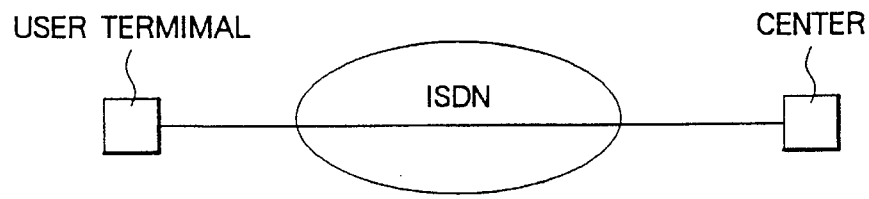
FIG. 1 is a view of the configuration of an embodiment of a data management system according to the present invention.

FIG. 1 is a view showing the system configuration using the data management method of the present invention.

The data management system shown in FIG. 1, when performing communication through a communication network such as an ISDN network, uses a signal channel between the user terminal and the data center (hereinafter referred to as the center) before formation of a data channel to transfer data for access to the data storage apparatus such as the request for utilization of the data storage apparatus (not shown) in the center and the designation of the requested data etc., and the data relating to data management such as the prohibition or release of copying and reediting between the center and user.

The user terminal and the center according to the present invention each include sending means for sending call control messages on the signal channel (such as the call setting message, call message, response message, disconnect message, release message, and release end message), receiving means for receiving these messages, communication means using the communication channel on the data channels, and means for input, output, and storage for data etc.

Note that even in this embodiment, the data etc., as mentioned above, has a broad meaning including data, information, music and video software, etc.

An explanation will now be made of the portion of an ISDN relating to the present invention.

In the ISDN, one line is comprised by two B channels and one D channel. The B channels are channels for transferring data and for example are driven at a transmission speed of 64 kb/s. The D channel is a channel for transmission of the call control data and for example is driven at a transmission speed of 16 kb/s.

The D channel has a sufficiently large capacity for transferring the call control data and is able to transfer as call control data, for example, the subscriber number of the caller, any data of a predetermined length (data among users), etc.), in addition to the telephone number of the other party and other minimum necessary control information.

The call control data is transferred before the call reception signal is returned. The present invention uses this call control data for the data management of the data transferred from the center to the user terminal.

Figure 2:
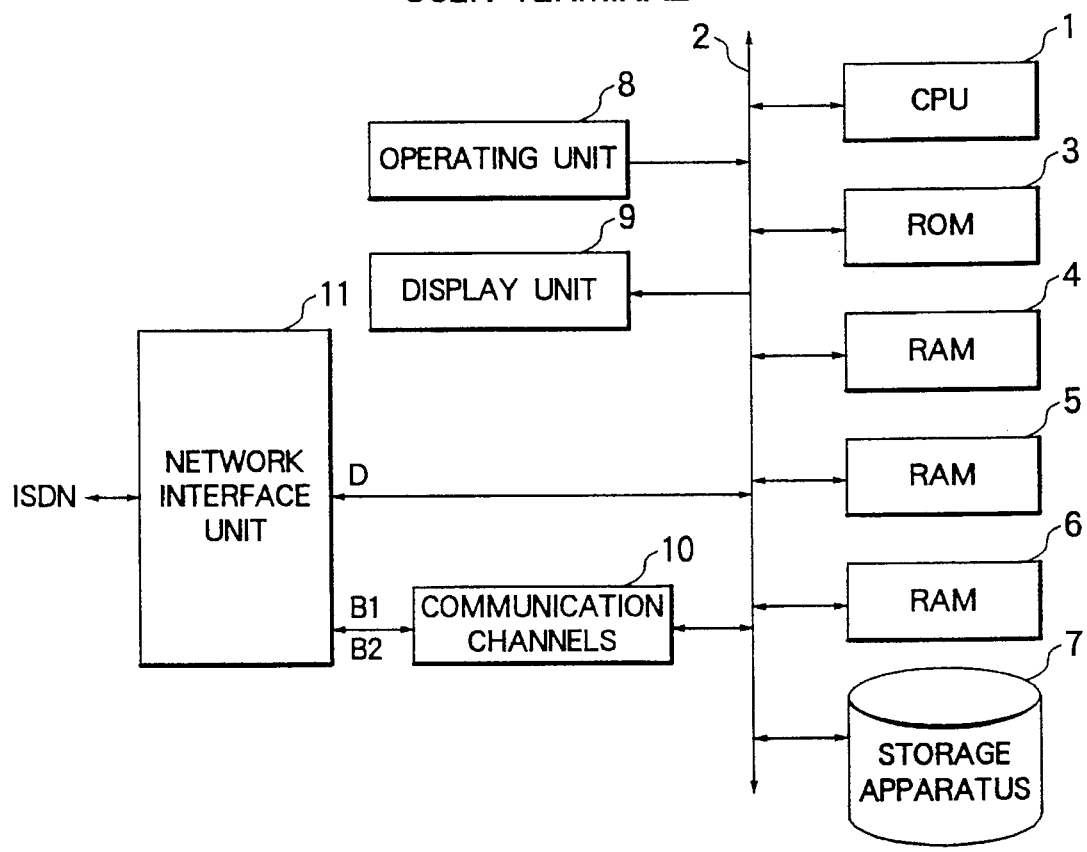
FIG. 2 is a view of the configuration of a user terminal shown in FIG. 1.

As shown in FIG. 2, the user terminal in this embodiment has a CPU 1 for executing the communication control program, a CPU 1 system bus 2 comprised of a data bus, an address bus, and a control bus, a ROM 3 for storing the communication control program in this embodiment, and a RAM 4 for storing the messages for the call control sent out. The user terminal further has a RAM 5 for storing the data for accessing the center from the user carried as user-user information in the call setting message (i.e, requests for utilization of the data storage apparatus in the center), designation of the requested data and other data for accessing the data storage apparatus, and personal ID data and caller numbers of the users. Further, the user terminal has a RAM 6 for storing a cipher code for requesting an opening key necessary at the time the user opens his own data storage apparatus which is carried as user-user information in the response message from the center, data from the center such as transmission end and notifications of charges for data which is carried as user-user information in the disconnect message from the center, and data from the center such as the opening key necessary at the time the user opens his own data storage apparatus which is carried as user-user information in the call message from the center. Further, the user terminal has a data storage apparatus 7 comprised of a hard disk, magnetic disk, semiconductor memory, etc. for storing the data etc. sent from the center through the data channel. Further, the user terminal has an operation unit 8 for the dial operation and preparing the information of the user a display unit 9 for displaying data from the data storage apparatus, data of the user a communication channel 10 serving as a data channel, and a network interface 11 with the ISDN network.

The ISDN network provides the user terminal with a D channel serving as the signal channel for transferring call control signals such as the call setting message, call message, response message, and disconnect message at the time of call origination and reception and B channels serving as data channels for transferring end-end data.

The above call setting message, call message, response message, and disconnect message include as one of the data elements user-user information able to be used for transfer of data between the user terminal and the center.

The network interface unit 11 separates and combines the signal channel, that is, D channel, and two data channels, that is, B1 channel and B2 channel, provided by the ISDN network and transfers call control signals with the CPU 1 through the D channel. Further, the network interface unit 11 transfers end-end data with the communication channel 10 through the B1 channel and the B2 channel.

The CPU 1 transfers call control signals with the network interface unit 11 through the system bus 2 and controls the operation of the user terminal as a whole based on the programs stored in the ROM 3.

Figure 3:
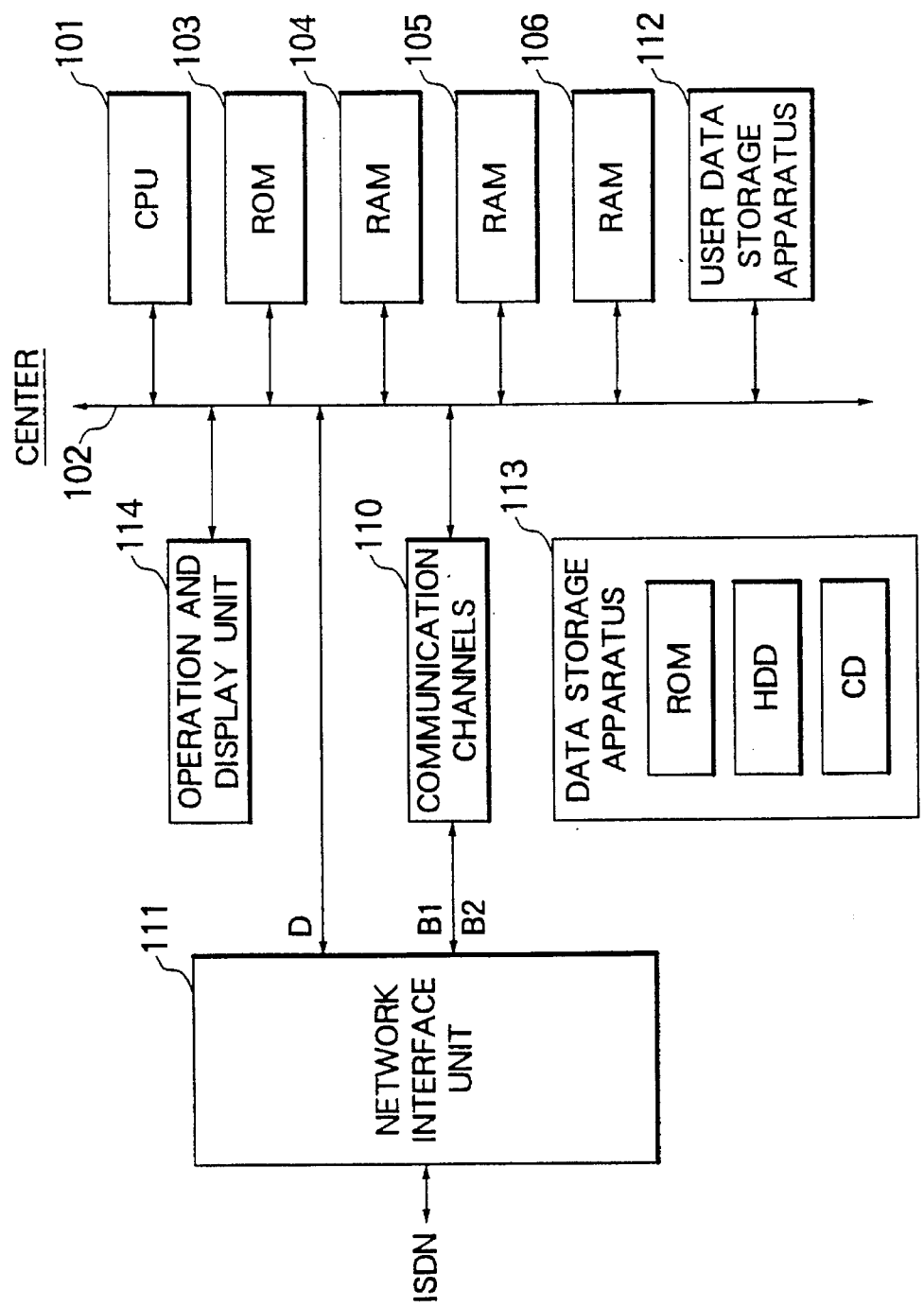
FIG. 3 is a view of the configuration of a center shown in FIG. 1.

As shown in FIG. 3, the center in this embodiment has the following constituent parts:

(1) A CPU 101 for executing the control program (2) A system bus 102 of the CPU 101 comprising a data bus, an address bus, and a control bus, (3) A ROM 103 for storing the control programs in the embodiment;

(4) A RAM 104 for storing the messages sent out for call control;

(5) A RAM 105 for storing data to be sent to the user placed on the call control messages as user-user information, that is, a request for preparation for reception, end of transmission, and other data from the center;

(6) A RAM 106 for storing data for accessing the center received from the user as user-user information on the call control messages, that is, the request for utilization of the data storage apparatus 113, the designation of the requested data etc., the personal ID data and caller number of the user, and other data;

(7) A user data storage apparatus 112 which could be a hard disk (HD), optical-magnetic disk, etc. for storing the personal ID data and caller number of the user, the opening key necessary at the time the user opens his own data storage apparatus 112, and other data relating to the user;

(8) A data storage apparatus 113 for storing the data etc. supplied to the user, such as data, music, video, and other software in for example a ROM, hard disk (HD), optical memory or compact disk;

(9) An operation and display unit 114 for setting the communication control and preparing the data management data etc. stored in the user data storage apparatus 112 and data storage apparatus 113;

(10) A communication channel 110, that is, data channel, for sending out the data stored in the data storage apparatus 113 to the ISDN network;

(11) A network interface unit 111 with the ISDN network.

Next, an explanation will be made, referring to FIG. 4 to FIG. 6, of the operation of the user terminal and the center using the data management method and system according to the present invention, performed between the user terminal and the center at the time a user acquires desired data etc. from the data storage apparatus 113 of the center.

Figure 4:
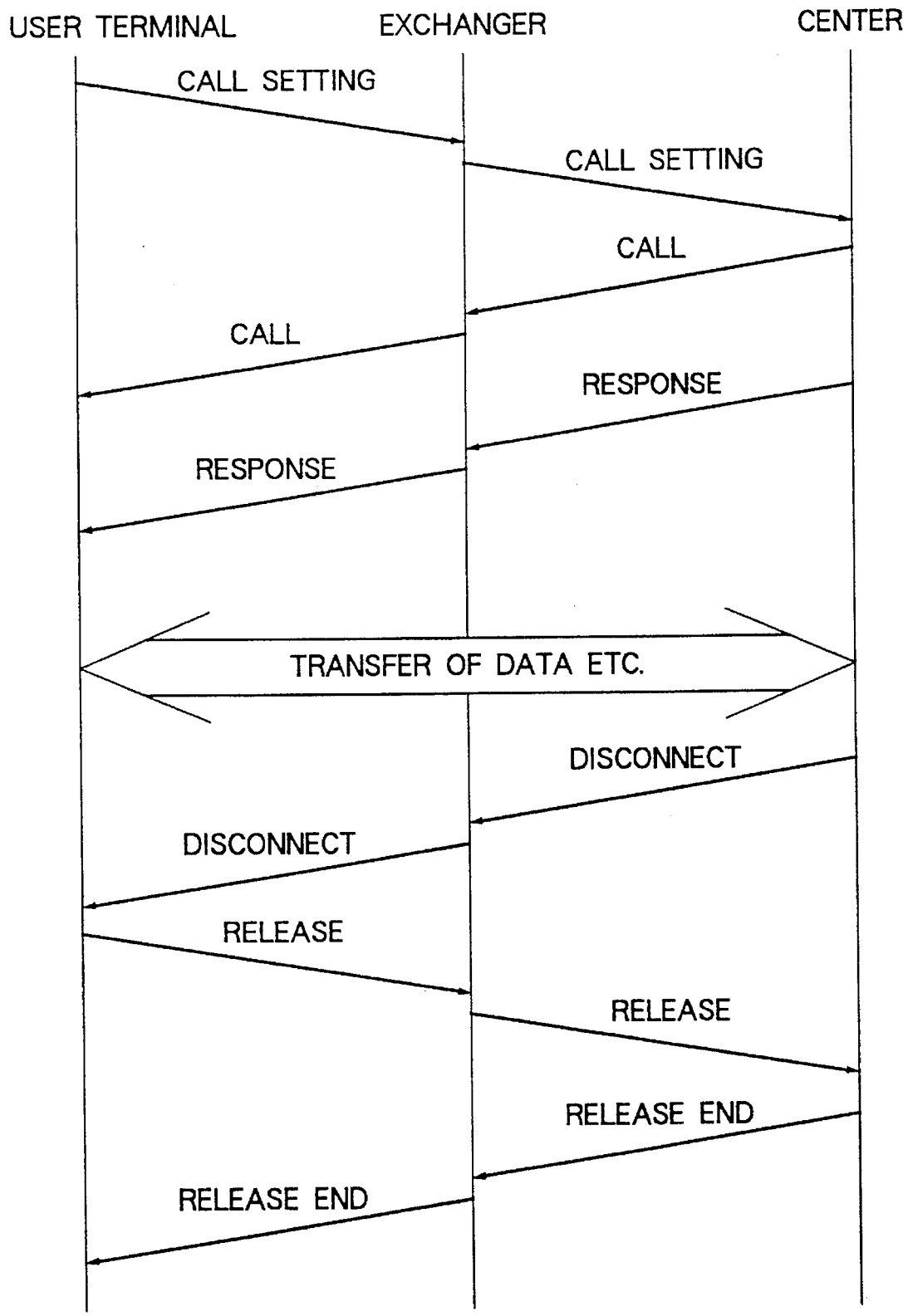
FIG. 4 is a timing chart showing a connection control routine among a user terminal, exchange, and center at the time of data transfer using the data management system according to the present invention.
Figure 5:
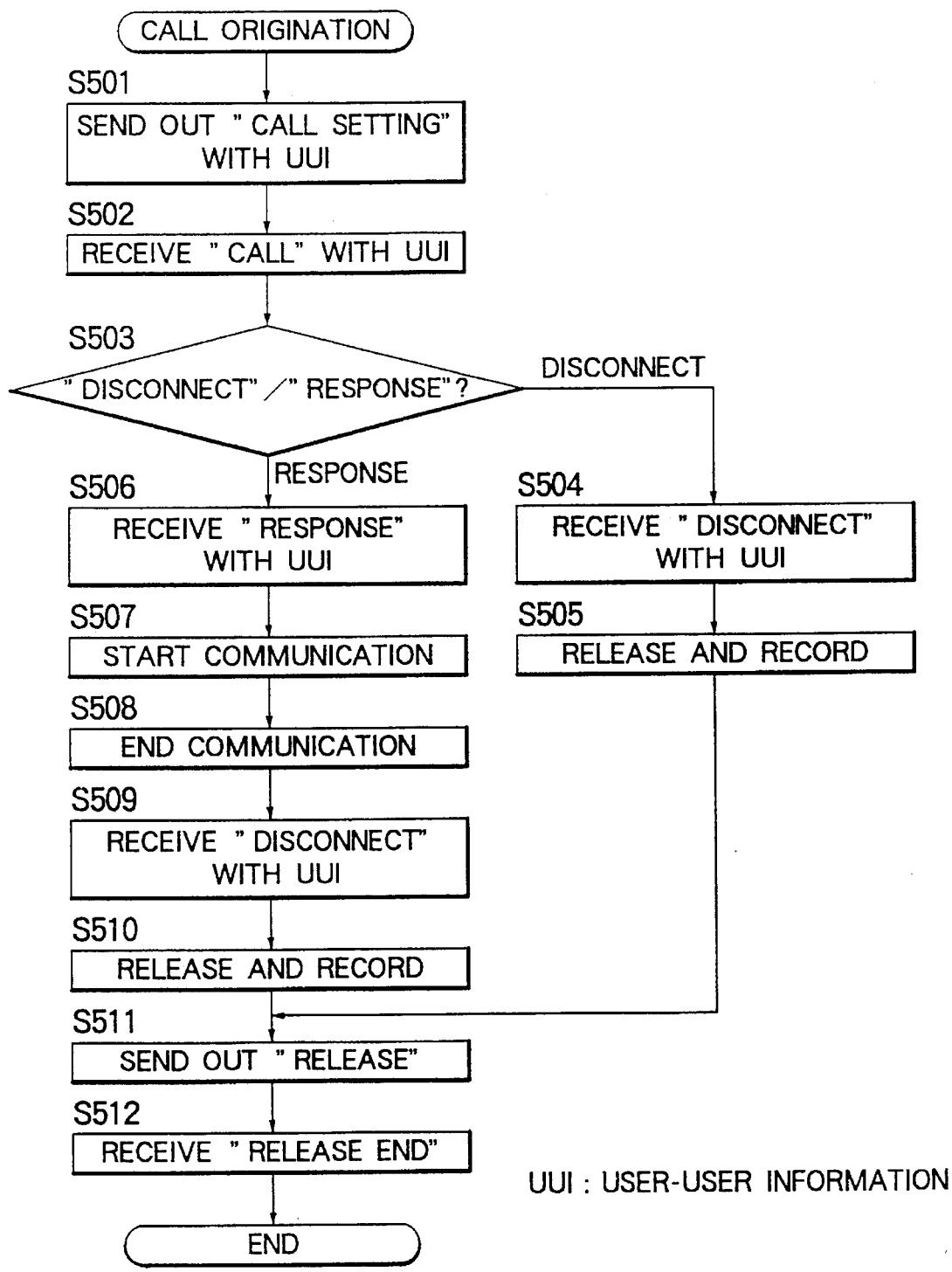
FIG. 5 is a flow chart showing the control routine at the time of data transfer of a user terminal according to the present invention.
Figure 6:
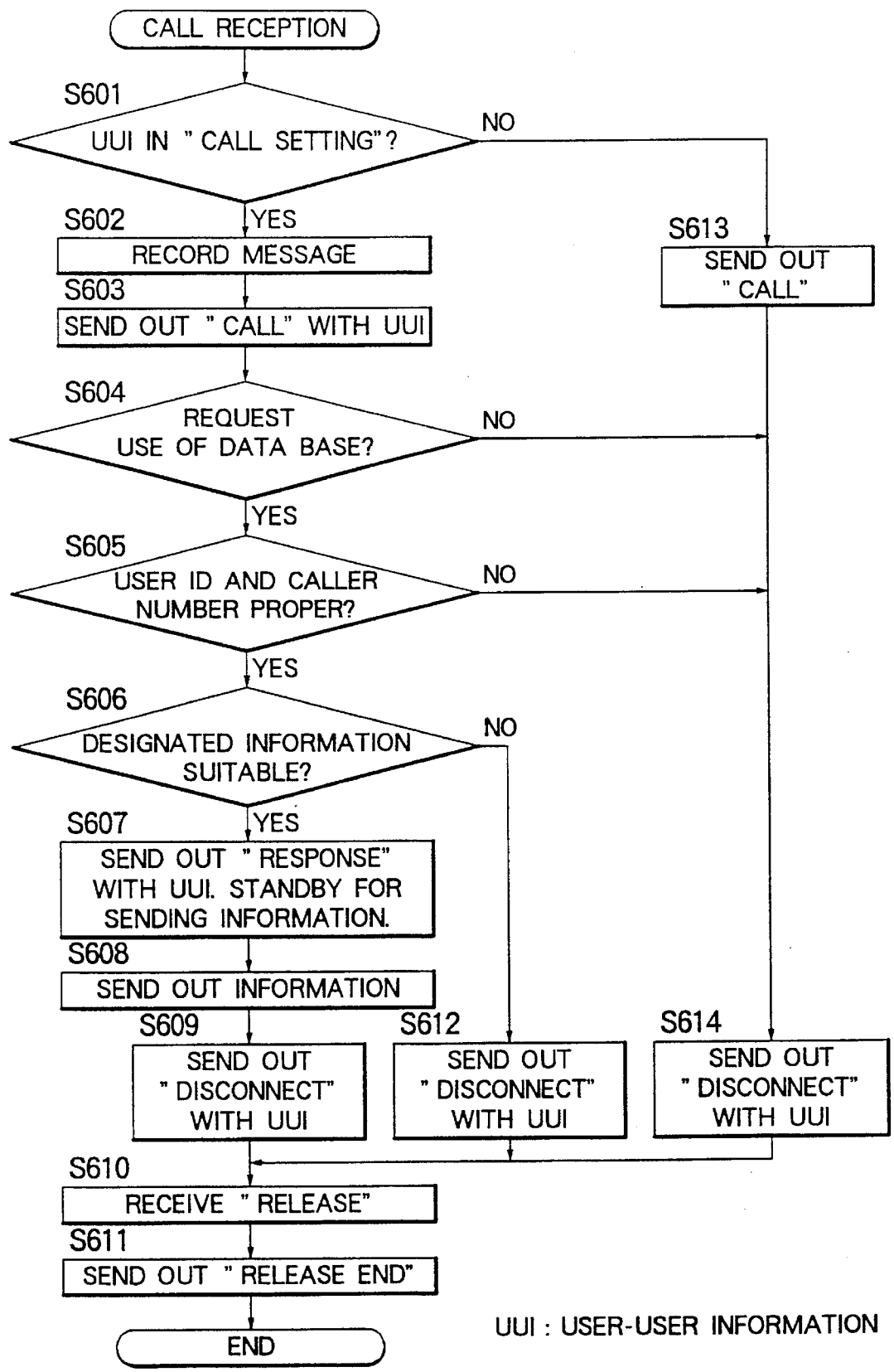
FIG. 6 is a flow chart showing the control routine at the time of data transfer of a center according to the present invention.

FIG. 4 is a timing chart showing a connection control routine among a user terminal, an exchange and the center as a time series, while FIG. 5 and FIG. 6 are flow charts showing the control routines for data transfer by a user terminal according to the present invention.

First, the connection control routine among the user terminal, exchange, and center using the data management system according to the present invention shown in FIG. 4 will be shown.

Routine 1: At the time of call origination, the user terminal sends out to the exchange a call setting message comprised of the request for utilization of the data storage apparatus 113 of the center, the personal ID data and caller number of the user, the designation of the requested data etc., and other access data carried on the user-user information. The exchange sends out this call setting message to the center.

The exchange just performs the role of an intermediary (exchange) of data between the user terminal and the center, so from here on, unless the exchange itself performs a special processing, the details of the processing by the exchange will not be alluded to.

Routine 2: The CPU 101 in the center, when receiving this call setting message at the time of call reception, extracts the user-user information from the call setting message. Then, it sends out a call message including the fact of the reception of the access data from the user as user-user information so as to show that it has received the message.

Routine 3: The CPU 101 in the center decodes the user-user information of the call setting message and judges if the use of the data storage apparatus in the data center is requested, if the personal ID data of the user is proper, if the caller number is proper, and what requested data etc. is designated.

Routine 4: When the access data from the user indicates that there is no request for utilization of the data storage apparatus 113, when the personal ID data of the user himself is not proper, when the caller number is not proper, when the designation of the requested data etc. is not proper, or when the requested data etc. does not exist, the CPU 101 in the center immediately sends out a disconnect message and shifts to the disconnect routine without going through the process of sending out a response message and forming a data channel.

Routine 5: When the access data from the user indicates that there is a request for utilization of the data storage apparatus 113, the personal ID data of the user himself is proper, the caller number is proper, and the designation of the requested data etc. is suitable, the CPU 101 in the center sends out a response message so that the data channel is formed and the designated data etc. is sent out.

At this time, the response message carries as the user-user information a cipher code for requesting an opening key to the center when the data etc. that the user acquired from the data storage apparatus 113 of the center which is to be accessed later.

Routine 6: When receiving a disconnect message following the call message, the user terminal shifts to the disconnect routine and ends the communication. At this time, the disconnect message from the center may be provided to the user carrying as user-user information the data to the effect that the method of access was not suitable.

Routine 7: When receiving a response message following the call message, the user terminal prepares for reception of the desired data etc. from the data storage apparatus 113 in the center and forms the data channel.

Routine 8: The center sends out the requested data etc. through the formed data channel and the user receives the desired data etc.

Routine 9: When the data transfer ends, the center shifts to the disconnect routine and ends the communication.

At that time, the disconnect message from the center may be provided to the user carrying as user-user information the charge for the data and the data relating to the source of data stored in the data storage apparatus 113.

Note that when the user later accesses the data etc. acquired from the data storage apparatus 113 of the center, the cipher code for requesting the opening key to the center can be carried not only in the response massage, but also in the call message or the call message and response message.

As explained above, the data management system according to the present invention decodes the user-user information carried in the call setting message and judges if there is a request for use of the data storage apparatus 113, if the personal ID data of the user is proper, if the caller number of the user himself is proper, and what data etc. is designated and therefore can be used both for the case where the subsequent connection control routine follows the connection control routine of the ISDN and the case where the process of sending out a response message and forming the data channel is not performed but, instead, but a disconnect message is immediately sent out and the disconnect routine performed.

Further, in the present invention, the response message from the center may carry as user-user information a cipher code for requesting the opening key necessary for the user to later access the data acquired from the data storage apparatus 113 of the center.

Next, an explanation will be made of the detailed operation of the user terminal referring to FIG. 5.

Step 501: At the time of call origination, the CPU 1 takes out the data stored in advance in the RAM 5 that enables the user to access the center, that is, the request for use of the data storage apparatus 113 in the center, the designation of the requested data etc., the personal ID data and caller number of the user, and other access data, places it in the user-user information of the call setting message stored in the RAM 4, and sends the result toward the center through the network interface unit 11 on the D channel of the ISDN network.

Step 502: Next, the CPU 1 receives as a response to the call setting message, a call message through the D channel of the ISDN network.

Step 503: The CPU 1 confirms if the message following the call message is a response message, in the case of the center responding to the request of the user, or a disconnect message, in the case of the center refusing the request of the user.

Steps 504 to 505: When the message following the call message is a disconnect message, the CPU 1 receives from the center a disconnect message which carries, as the user-user information, the reasons for refusal of the user's request (step 504) and which the CPU 1 then decodes and records the (step 505) and then performs the disconnect routine from step 511 on.

Steps 506 to 510: Further, if, at step 503, the message following the call message is a response message of the center responding to the request of the user, the CPU 1 receives a response message carrying, as user-user information, a message requesting a standby to acquire the data etc. and a cipher code for requesting from the data storage apparatus 113 of the center the opening key necessary when the user opens his own storage apparatus 7 (step 506), connects the data channels to start communication with the center (step 507), and stores the data etc. sent from the center, that is, the music, video, or other software, in the storage apparatus 7. When ending communication with the center (step 508), the CPU 1 then receives a disconnect message on which is placed the charges for the data and the data relating to the source of data stored in the data storage apparatus 113 (step 509). The CPU 1 then decodes and records the user-user information (step 510) and performs the disconnect routine from step 511 on.

The detailed operation of the center will be explained below With reference to FIG. 6.

The network interface unit 111 receives a call setting message sent from the user terminal through the D channel of the ISDN network and sends the call setting message to the CPU 101.

The CPU 101 receiving the call setting message confirms the presence of the user-user information at step 601 of FIG. 6. when there is user-user information then at step 602, the CPU 101 stores the user-user information in the area of the RAM 106 for storing the user-user information carried in the received call setting message. Then, at step 603, the CPU 101 sends out, as user-user information placed on the call message, acknowledgement of the fact that the access data from the user was received.

Next, the CPU 101 judges at step 604 if the user shows any intention of using the data storage apparatus 113. If it judges that there is an intention to use, then, at step 605, the CPU 101 compares the personal ID data received from the user stored in the RAM 106 with the user and data stored in the user data storage apparatus 112 to judge if the personal ID data of the user is correct or not.

Further, the CPU 101 compares the caller number received from the user and stored in the RAM 106 with the caller number of the user given by the communication network to judge if the caller number of the user is correct or not. When the personal ID data and the caller number of the user are correct, then, at step 606, the CPU 1 considers the data etc. requested by the user and the data list of the data storage apparatus 113 to judge if the data etc. requested by the user is suitable.

When the data etc. requested by the user is suitable, the processing of the CPU 101 shifts to step 607. At step 607, the CPU 101 sends out a response message in which is placed, as user-user information, an indication that it will send out the data etc. requested by the user using the data channels and also includes a cipher code, that is stored in the user's data storage apparatus 112, for requesting from the center the opening key necessary when the user opens his own data storage apparatus 7 and at the same time places the data storage apparatus 113 on standby to send out the desired data etc. using the data channels.

Next, the CPU 101 completes the data channel at step 608 and sends out the desired data etc. from the data storage apparatus 113.

Note that the data storage apparatus 113 stores the source of the data supplied to the user in a semiconductor memory, for example, a ROM, or a hard disk, optical-magnetic memory, compact disk, or other recording medium. The recording medium may be switched in accordance with the frequency of use.

If ending the transmission of the data etc., the CPU 101 sends out a disconnect message stored in the RAM 104 at step 609. At this time, the disconnect message may be sent carrying, as user-user information, the charge for the data or a guide to the data etc. stored.

Next, at steep 610, the CPU 101 receives the release message from the user terminal and, at step 611, sends out a release end message to the user terminal and ends the series of connection control routines.

Note that when there was no user-user information in the call setting message at step 601, the CPU 101 sends out a call message not carrying user-user information at step 613 and sends out a disconnect message at the following step 614 and then shifts to the control end routine of step 610 and step 611.

Further, when the user does not show any intention of using the data storage apparatus 113 at step 604 or the personal ID data and caller number of the user are not correct at step 605, the CPU 101 shifts to step 614, step 610, and step 611 for the connection end routine.

Further, when the data etc. requested by the user is not appropriate at step 606, the CPU 101 sends out a disconnect message carrying the fact that the data etc. requested by the user is not appropriate at step 612 and then shifts to the connection end routine of step 610 and step 611.

Next, an explanation will be made, referring to FIG. 7 to FIG. 10, of the operation of the user terminal and the center using the data management system according to the present invention at the time the user uses the data etc. acquired from the data storage apparatus 113 of the center.

Figure 7:
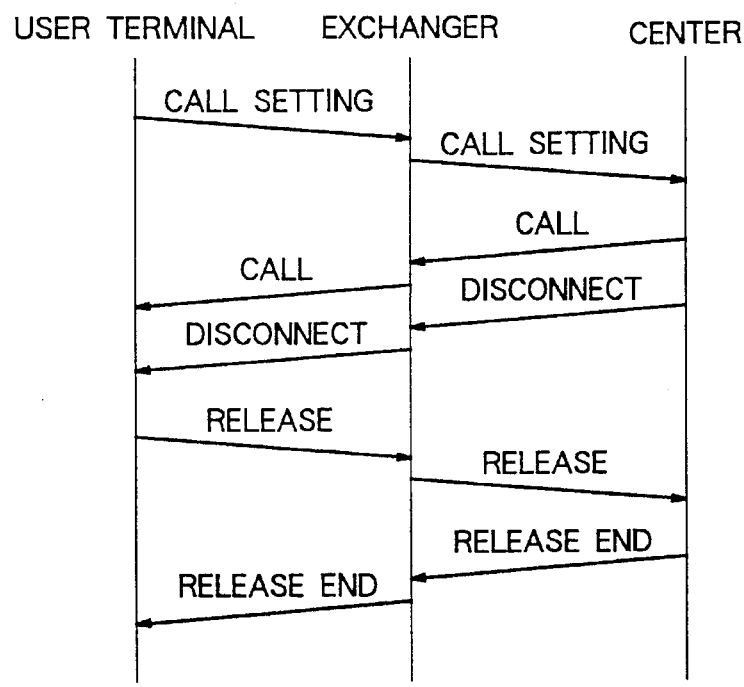
FIG. 7 is a connection control routine among a user terminal, exchange, and center as an example of key transfer using the data management system according to the present invention.
Figure 8:
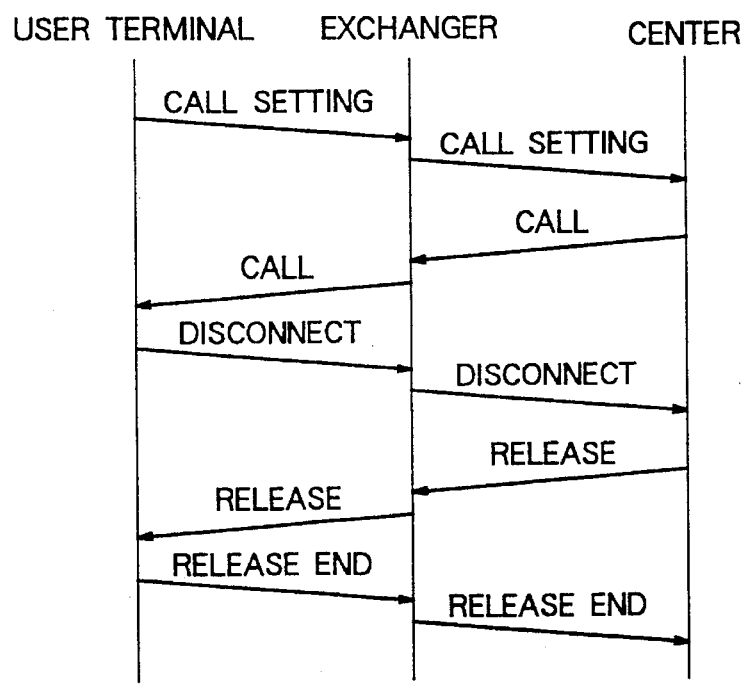
FIG. 8 is a connection control routine among a user terminal, exchange, and center as another example of key transfer using the data management system according to the present invention.
Figure 9:
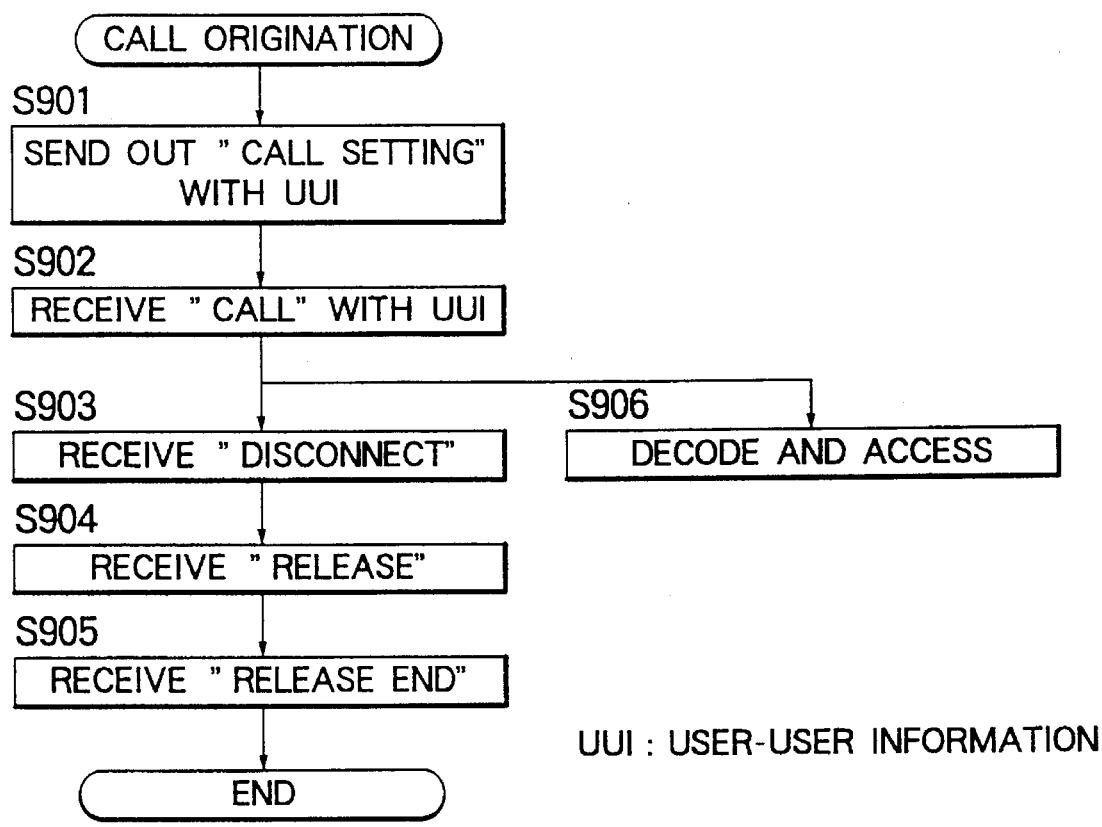
FIG. 9 is a flow chart showing the control routine at the time of key transfer of a user terminal according to the present invention.
Figure 10:
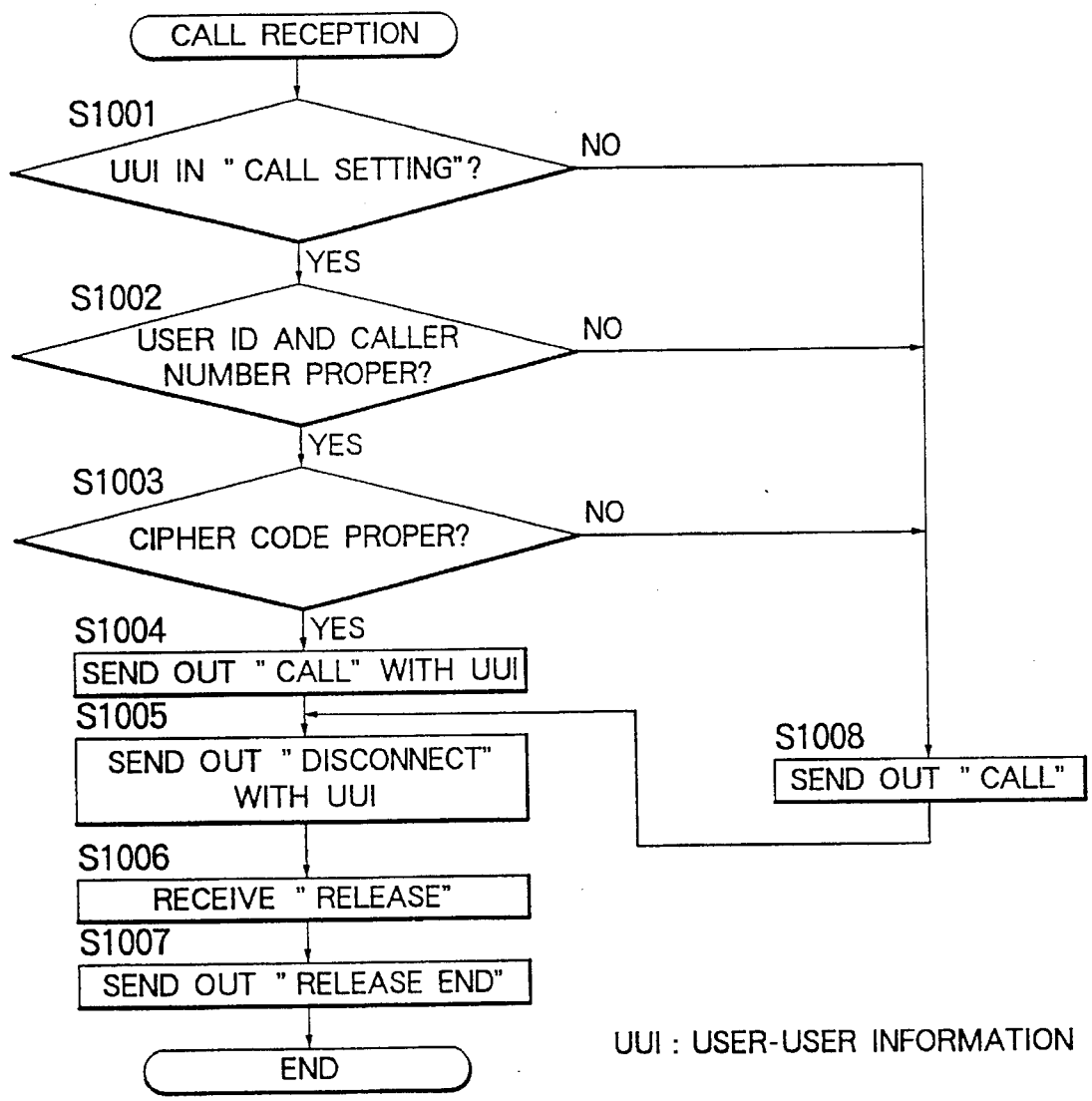
FIG. 10 is a flow chart showing the control routine at the time of key transfer of a center according to the present invention.

FIG. 7 is a timing chart showing a connection control routine among a user terminal, exchange, and center. FIG. 8 is another timing chart of a connection control routine among a User terminal, exchange, and center. FIG. 9 is a flow chart showing the processing of the user terminal, and FIG. 10 is a flow chart showing the processing of the center.

First, the connection control routine among the user terminal, exchange, and center using the data management system according to the present invention shown in FIG. 7 will be discussed.

Routine 1: The user, at the time of accessing data etc. obtained from the center, uses the connection control routine between the user terminal and the center to request a key for opening its own data storage apparatus 113.

At the time of call origination, the user sends out a call setting message which includes the personal ID data and caller number of the user, the designation of the data etc. requested to be opened, and other access data and the cipher code for requesting the opening key that was sent previously in a response message from the center and was stored in the RAM 6 and all of which placed on the user-user information.

Routine 2: The center, when receiving this call setting message at the time of call reception, extracts the user-user information from the call setting message.

Routine 3: The center decodes the user-user information of the call setting message and judges if the personal ID data of the user is proper, if the caller number of the user himself is proper, if the cipher code requesting the opening key is proper, and what requested data etc. is designated.

Routine 4: When the personal ID data of the user is not proper, when the caller number of the user is not proper, when the cipher code requesting the opening key is not proper, or when the designation of the data etc. for which opening is requested is not proper then, the center sends out a disconnect message after the call message and shifts to the disconnect routine.

Routine 5: When the personal ID data of the user is proper, when the caller number of the user is proper, when the cipher code requesting the opening key is proper, and when the designation of the data etc. for which opening is requested is proper then, the center sends out a call message carrying the opening key as user-user information. It then sends out a disconnect message and shifts to the disconnect routine.

Note that the disconnect routine may be made so that the disconnect message is sent out from the user side as shown in FIG. 8.

Routine 6: Receiving the opening key, the user terminal uses the key and opens the desired data etc. from the storage apparatus.

In the above way, in the data management system according to the present invention, at the time of accessing the data etc. acquired from the data storage apparatus 113 of the center, the user can use the cipher code for requesting the opening key sent in the connection control routine and request from the center the key for opening his own data storage apparatus 113 using the call setting message once again. Further, when receiving the cipher code and confirming its properness, the center may use the call message to send out the opening key. Receiving this, the user terminal may use the key and open the desired data etc. from the storage apparatus.

Next, an explanation will be made of the operation of the user terminal when the user accesses the data etc. acquired from the center referring to FIG. 9.

At the time of call origination, the CPU 1, at step 901, takes out the user's personal ID data, caller number, and other access data for accessing the center to be sent carried in the call setting message and which was stored in advance in the RAM 5, places this in the user-user information of the call setting message stored in the RAM 4, and sends the result toward the center through the network interface unit 11, on the D channel of the ISDN network.

At this time, the user-user information of the call setting message is sent out carrying the cipher code for requesting the opening key, that was sent by the center in the response message in the previous connection control routine and stored in the RAM 6.

Next, at step 902, the CPU 1 receives a call message from the center through the D channel of the ISDN network as a response to the call setting message.

At this time, an opening key may be placed on the call message if the personal ID data, caller number, and other access data of the user and cipher code requesting an opening key sent out from the user to the center at step 901 match with those stored in the center. When they do not match, the opening key may not be placed on it.

Next, the CPU 1 receives a disconnect message sent from the center at step 903 and shifts to the disconnect routine of steps 904 and 905.

Further, in parallel with the processing of step 903, at step 906, the CPU 1 accesses the data from the center stored in the storage apparatus 7 using an opening key sent from the center.

Further, the disconnect routine from step 903 onward can, of course, be started also from the user terminal as shown in FIG. 8.

The operation of the center will be explained with reference to FIG. 10.

The center receives a call setting message sent from the user terminal through the D channel of the ISDN network.

The CPU 101 confirms at step 1001 if there is user-user information in the call setting message.

When there is user-user information, the CPU 101 confirms at step 1002 if the user-user information contains a user ID or caller number and if these are correct.

When there is a user ID and caller number and these are correct, the CPU 101 confirms at step 1003 if the user-user information carries a cipher code for requesting an opening key and if it is correct.

When it carries the code and that code is correct, the CPU 101 sends out a call message at step 1004. At this time, the user-user information of the call message carries an opening key.

Next, the CPU 101 sends out a disconnect message at step 1005. At this time, it is also possible to send out a data guide etc. on the stored data carried as user-user information in the disconnect message.

Next, the CPU 101 receives a release message from the user terminal at step 1006 and sends out a release end message to the user terminal at step 1007 to end the connection control routine.

Note that when there is no user-user information in the call setting message at step 1001, the CPU 101 sends out a call message not carrying user-user information at step 1008, then sends out a disconnect message at step 1005 and shifts to a connection ending routine of step 1006 and step 1007.

Further, when there is no user ID or caller number in the user-user information at step 1002 or the same are not correct or when the user-user information at step 1003 does not carry a cipher code requesting a key for opening and sealing the user-user information or the same are not correct, the CPU 101 sends out a call message at step 1008.

Next, the CPU 101 sends out a disconnect message at step 1005, receives a release message from the user terminal at step 1006, sends out a release end message to the user terminal at step 1007, and completes the connection control routine.

Above, an explanation was given of the embodiments of the present invention, but the present invention is not limited to the above embodiments and can take the form of various modifications performing similar processing to the above.

According to the data management method and system of the present invention, it is possible to transfer control data regarding data management, such as prohibiting or releasing copying or reediting, among a center and user in the call connecting routine before using the data channel to actually transfer the desired data between the user and center and it is possible to manage from the center, the data etc. transferred to the user terminal.

What is claimed is:

1. A data management system in a data communication system comprising a control means which, when performing data communication between a first communication means and a second communication means, establishes a signal channel before establishing a data channel and transfers control data for data management between said first communication means and said second communication means through said signal channel before using said data channel to transfer managed data.

2. A data management system as set forth in claim 1, wherein:

said first communication means is a data center;

said second communication means is a user terminal;

a key is used by said user terminal to open or decode the managed data at the time of sending out the managed data from said data center to said user terminal; and said control means further includes a first sending means for sending out a first cipher code for requesting the key required for opening or decoding said managed data from said user terminal to said data center before transfer of said managed data and sending out a second cipher code necessary for opening or decoding said managed data from said data center to said user terminal, and a second sending means for sending out a third cipher code necessary for opening or decoding said managed data from said user terminal to said data center and sending out a fourth cipher code necessary for opening or decoding said managed data from said data center to said user terminal.

3. A data management system as set forth in claim 2, wherein said first sending means uses as said first cipher code user identification data specifying the party using said user terminal.

4. A data management system as set forth in claim 2, wherein said first sending means uses as said second cipher code a predetermined cipher code for requesting the key necessary for opening or decoding said managed data.

5. A data management system as set forth in claim 2, wherein said second sending means uses as said third cipher code user identification data specifying said party using said user terminal and a predetermined cipher code for requesting the key necessary for opening or decoding said managed data.

6. A data management system as set forth in claim 2, wherein said second sending means uses as said fourth cipher code the key necessary for opening or decoding said managed data.

7. A data management system as set forth in claim 2, wherein said first sending means and said second sending means transfer said first cipher code, said second cipher code, said third cipher code, and said fourth cipher code in a call control step of said data communication between said user terminal and said data center.

8. A data management system as set forth in claim 7, wherein said first sending means and said second sending means use an integrated services digital network (ISDN) call control step as said call control step between said user terminal and said data center.

9. A data management system as set forth in claim 7, wherein said first sending means and said second sending means include said first cipher code, said second cipher code, said third cipher code, and said fourth cipher code in a user-user information in said call control step between said user terminal and said data center.

10. A data management system as set forth in claim 2, wherein:

said first sending means includes said first cipher code in a user-user information of a call setting message from said user terminal to said data center and includes said second cipher code in a call message, response message, or call message and response message from said data center to said user terminal; and said second sending means includes said third cipher code in the user-user information of said call setting message from said user terminal to said data center and includes said fourth cipher code in said user-user information of said call message from said data center to said user terminal.

11. A data management method in a data communication system for performing data communication between a first communication means and a second communication means, comprising the steps of:

forming a signal channel before formation of a data channel;

via said signal channel, enabling transfer of managed data among said first communication means and said second communication means before said data channel is used to transfer data; and transferring control data regarding a data management by using said signal channel.

12. A data management method as set forth in claim 11, wherein the method further comprises the steps of:

using a data center as the first communication means;

using a user terminal as the second communications means;

using a key in the user terminal to open or decode managed data when the managed data is sent from said data center to said user terminal;

sending out a first cipher code for requesting said key from said user terminal to said data center before transfer of the managed data;

sending out a second cipher code responding to said request for the key from said data center to said user terminal;

sending out a third cipher code for applying for said key from said user terminal to said data center; and sending out a fourth cipher code responding to the application for the key from said data center to said user terminal.

13. A data management method as set forth in claim 12, wherein:

at said step of sending out said first cipher code, the party using said user terminal is specified.

14. A data management method as set forth in claim 12, wherein:

at said step of sending out said second cipher code, a predetermined cipher code for requesting the key necessary for opening or decoding said managed data is sent.

15. A data management method as set forth in claim 12, wherein:

at said step of sending out said third cipher code, user identification data specifying the party using said user terminal and a predetermined cipher code for requesting the key necessary for opening or decoding said managed data are sent.

16. A data management method as set forth in claim 12, wherein:

at said step of sending out said fourth cipher code, the key necessary for opening or decoding said managed data is sent.

17. A data management method as set forth in claim 12, further comprising the step of performing a call control step between said user terminal and said data center at said steps of sending out said first cipher code, said second cipher code, said third cipher code, and said fourth cipher code between said user terminal and said data center.

18. A data management method as set forth in claim 17, wherein:

said call control step between said user terminal and said data center is an integrated services digital network (ISDN) call control step.

19. A data management method as set forth in claim 17, wherein:

said first cipher code, said second cipher code, said third cipher code, and said fourth cipher code are sent between said user terminal and said data center in user-user information in said call control step.

20. A data management method as set forth in claim 11, further comprising the steps of:

using a data center as the first communication means;

using a user terminal as the second communications means;

using a key in the user terminal to open or decode the managed data when the managed data is sent from said data center to said user terminal;

sending out a user identification data specifying the party using said user terminal from said user terminal to said data center placed in a user-user information of a call setting message sent from the user terminal to the data center on the signal channel which requests that the data center set up the data channel before the transfer of the managed data;

sending out a cipher code for requesting the key required for opening or decoding said managed data from said data center to the user terminal placed in either a call message or a response message;

sending out the cipher code for requesting the key required for opening or decoding the managed data from said user terminal to said data center placed in the user-user information of said call setting message after the transfer of the managed data; and sending out said key necessary for opening or decoding the managed data from said data center to said user terminal placed in the user-user information of said call message.

21. A data management method as set forth in claim 20, further comprising the step of:

placing charge data regarding a charge for the managed data or a source of the managed data stored in a data storage apparatus in the data center in the user-user information of a disconnect message from the data center sent following the managed data transfer.

22. A data management method as set forth in claim 11, further comprising the steps of:

using a data center as the first communication means;

using a user terminal as the second communications means;

using a key in the user terminal to open or decode the managed data when the managed data is sent from said data center to said user terminal;

sending out user identification data specifying the party using said user terminal from said user terminal to said data center placed in the user-user information of a call setting message sent from the user terminal to the data center on the signal channel which requests that the data center set up the data channel;

sending out a cipher code for requesting the key required for opening or decoding the managed data from said data center to the user terminal placed in either a call message or a response message in the case where the user identification data specifying the party using said user terminal from said user-user information of said call setting message in said data center is confirmed;

storing said cipher code in said user terminal;

sending out said managed data from said data center to said user terminal;

storing said managed data in said user terminal;

sending out the user identification data specifying the party using said user terminal and the cipher code for requesting the key required for opening or decoding the managed data from said user terminal to said data center placed in said user-user information of said call setting message at the time of opening or decoding the managed data in said user terminal; and sending out the key necessary for opening or decoding the managed data from said data center to said user terminal placed in said user-user information of said call message.

* * * * *